United States Patent
Wirz et al.

(10) Patent No.: US 11,143,123 B2
(45) Date of Patent: Oct. 12, 2021

(54) GAS FEED METHOD FOR A GAS ENGINE OR DUAL-FUEL ENGINE, AND GAS SUPPLY APPARATUS FOR SAME

(71) Applicant: Technische Universitaet Hamburg-Harburg, Hamburg (DE)

(72) Inventors: Friedrich Wirz, Holm (DE); Thilo Panten, Hamburg (DE)

(73) Assignee: Technische Universitaet Hamburg-Harburg, Hamburg (DE)

( * ) Notice: Subject to any disclaimer, the term of this patent is extended or adjusted under 35 U.S.C. 154(b) by 51 days.

(21) Appl. No.: 16/324,962

(22) PCT Filed: Aug. 15, 2017

(86) PCT No.: PCT/DE2017/100685
§ 371 (c)(1),
(2) Date: Feb. 12, 2019

(87) PCT Pub. No.: WO2018/033185
PCT Pub. Date: Feb. 22, 2018

(65) Prior Publication Data
US 2019/0178176 A1    Jun. 13, 2019

(30) Foreign Application Priority Data

Aug. 15, 2016    (DE) .................. 10 2016 115 113.0

(51) Int. Cl.
*F02D 41/00* (2006.01)
*F02M 21/02* (2006.01)
(Continued)

(52) U.S. Cl.
CPC ....... *F02D 41/0027* (2013.01); *F02D 19/022* (2013.01); *F02D 19/0605* (2013.01);
(Continued)

(58) Field of Classification Search
CPC .............. F02D 41/0027; F02D 19/022; F02D 19/0605; F02D 41/0025; F02D 2200/0602;
(Continued)

(56) References Cited

U.S. PATENT DOCUMENTS 2,921,603 A * 1/1960 Lofink ............... F16K 3/26
137/625.38
3,012,573 A * 12/1961 Peterson ............ G05D 16/0683
137/505

(Continued)

FOREIGN PATENT DOCUMENTS

DE    3643318 A1    6/1988
DE    19735315 A1    2/1999
(Continued)

OTHER PUBLICATIONS

International Search Report dated Nov. 21, 2017, in International Application No. PCT/DE2017/100685.
(Continued)

*Primary Examiner* — Joseph J Dallo
*Assistant Examiner* — Kurt Philip Liethen
(74) *Attorney, Agent, or Firm* — Patent Central LLC; Stephan A. Pendorf

(57) ABSTRACT

A gas feed method for a gas engine or dual-fuel engine in which combustion gas (G) is burned with combustion air (L). A gas valve (1) for the feed of combustion gas (G) into the combustion air (L) is arranged upstream of the gas engine or dual-fuel engine. The combustion gas (G) is fed in uncontrolled fashion to the gas valve (1) independently of the operating state of the gas engine or dual-fuel engine. The invention furthermore relates to a gas supply apparatus. A gas valve (1) for the feed of combustion gas (G) into the combustion air (L) is arranged in the gas feed (10) upstream
(Continued)

of the gas engine or dual-fuel engine. Control of the gas pressure in a manner dependent on the operating state of the gas engine or dual-fuel engine is not provided upstream of the gas valve (1).

13 Claims, 4 Drawing Sheets

(51) Int. Cl.
*F02D 19/02* (2006.01)
*F02D 19/06* (2006.01)
(52) U.S. Cl.
CPC ..... *F02D 41/0025* (2013.01); *F02M 21/0239* (2013.01); *F02M 21/0272* (2013.01); *F02M 21/0278* (2013.01); *F02D 2200/0602* (2013.01); *F02D 2200/0606* (2013.01); *Y02T 10/30* (2013.01)
(58) Field of Classification Search
CPC ........ F02D 2200/0606; F02M 21/0272; F02M 21/0239; F02M 21/0278; Y02T 10/30
See application file for complete search history.

(56) References Cited

U.S. PATENT DOCUMENTS

| | | | |
|---|---|---|---|
| 5,752,489 A | 5/1998 | Henderson et al. | |
| 6,345,768 B1* | 2/2002 | Inagaki | F23N 5/027 236/15 A |
| 6,748,932 B1* | 6/2004 | Sorter | F02B 43/10 123/527 |
| 8,272,399 B2 | 9/2012 | Farrow et al. | |
| 2003/0168619 A1* | 9/2003 | Jansen | F16K 31/10 251/129.07 |
| 2006/0124112 A1* | 6/2006 | Turner | F02M 21/0239 123/516 |
| 2009/0071444 A1* | 3/2009 | Takagi | F02M 37/0029 123/447 |
| 2018/0306329 A1* | 10/2018 | Bucknor | F01K 23/10 |

FOREIGN PATENT DOCUMENTS

| | | |
|---|---|---|
| DE | 102009002836 A1 | 11/2010 |
| DE | 102007050151 B4 | 10/2014 |
| DE | 112012005503 T5 | 1/2015 |
| EP | 0690215 A2 | 1/1996 |
| EP | 2381146 A2 | 10/2011 |
| JP | 0842400 A | 2/1996 |
| JP | 2013133792 A | 7/2013 |
| WO | 2007118674 A2 | 10/2007 |

OTHER PUBLICATIONS

Korean Office Action (with English language translation) dated Feb. 17, 2021, in Korean Application No. 10-2019-7007540.

* cited by examiner

GAS FEED METHOD FOR A GAS ENGINE OR DUAL-FUEL ENGINE, AND GAS SUPPLY APPARATUS FOR SAME

BACKGROUND OF THE INVENTION

Field of the Invention

The invention relates to a gas feed method for a gas engine or dual-fuel engine, in which combustion gas is burned with combustion air, wherein a gas valve for supplying combustion gas into the combustion air is disposed upstream of the gas engine or dual-fuel engine. Furthermore, the invention relates to a gas feed apparatus for a gas engine or dual-fuel engine, in which combustion gas is burned with the combustion air, with a pressurized gas source and a gas feed to the gas engine or dual-fuel engine, wherein a gas valve for the feed of combustion gas into the combustion air is arranged in the gas feed upstream of the gas engine or dual-fuel.

Description of the Related Art

Gas engines or dual fuel engines have allocated to each cylinder not only intake and exhaust valves but in addition a gas valve, so that the combustion gas thus supplied through the gas line remains compartmentalized from the combustion air. This gas valve is for example opened during the intake stroke and is subsequently closed again. During the opening phase, combustion gas flows via the gas line through the gas valve into an antechamber before the inlet valve or the inlet valves, so that the desired mixture of combustion gas and combustion air forms there, which then flows during the opening of the inlet valve into the combustion chamber of the cylinder. With today's gas engines and dual fuel engines, this obligatory gas valve is usually electrically operated via an actuator.

Furthermore, for the known gas engines and dual-fuel engines, a so-called gas control system is always provided, which controls the gas pressure of the combustion gas supplied via the gas line to the internal combustion engine to be supplied with gas. The gas control system is intended to control the instantaneous gas pressure of the supplied combustion gas so that the differential pressure across the internal combustion engine side gas valve is kept as constant as possible in order to ensure that the commercially available valves can be operated according to requirements during operation. Therein, for maintaining constant the differential pressure, it is necessary that a pressure regulator in the gas control system continuously adjusts the gas pressure according to the load situation and charge air pressure of the gas engine or the dual fuel engine. Here, it is necessary that the usually high-volume gas control system is arranged as near the internal combustion engine as possible, to minimize the inertia of the system. In particular, in the mobile application, such as in marine propulsion, the positioning of the gas control system represents a significant constraint on ship design. In addition, the manufacturer of the internal combustion engine is forced to integrate the gas control system, which often does not come from its own product portfolio, in the control of the internal combustion engine.

Pressure-balanced valves are known in particular for pneumatic suspension systems for engine vehicles, for example from DE 10 2007 050 151 B4, DE 36 43 318 A1, WO 2007/118674 A2 or EP 2 381 146 A2. However, the requirements for such a valve for pneumatic suspensions in engine vehicles are not comparable with the requirements for a gas valve for engines. Special features of pressure relief valves for use in automotive air suspension systems are their simple construction and the ability to open against high pressure differentials (up to 10 bar). Such a valve cannot be used for the gas feed for engines, especially since they were not designed for the very dynamic operation (about 375 operations per minute in a medium-speed dual-fuel engine), as occurs in piston engines. Furthermore, it is questionable whether the required amount of gas can be supplied within the time available using the described embodiments.

In automotive technology, pressure-balanced valves are known as cam controlled, shaft guided intake valves, for example, from DE 197 35 315 A1. Therewith, when closing the inlet poppet valve, the high loads acting on the valve train due to the high gas pressure in the working chamber of the engine should be avoided. This valve is controlled mechanically so that the sliding surfaces wear out due to friction. With this intake valve, therefore, the inlet of the fuel/gas/air mixture from the inlet channel into the working chamber of the internal combustion engine is controlled directly. However, this inlet valve is not suitable for the shut-off of the gas feed to the combustion gas line, because the opening cross-section is too small, so that the combustion gas could not flow in sufficient quantities at the prevailing pressure differences.

Furthermore, DE 10 2009 002 836 A1 shows a pressure-balanced gas valve for dosing of gaseous fuel such as natural gas, LPG or hydrogen for gas engines or fuel cell propulsion.

A similar arrangement is described in U.S. Pat. No. 8,272,399 B2 as a fuel supply valve immediately before the inlet region of a fuel engine, wherein the valve is completely or at least partially compensated.

Nevertheless, for gas engines or dual-fuel engines there have been provided for decades so-called gas pressure control systems, which are arranged in the inlet of the combustion gas, preferably arranged immediately before the gas feed means, via a gas valve at combustion air line. Such gas pressure control lines often have, in addition to control of the pressure of the inflowing gas, further safety functions, such as, for example, a gas filter and an emergency shutdown. Typical gas control lines for marine engines have a length of 1 to 3 meters. Accordingly, the appropriate spatial layout such a facility in the ship hull is correspondingly difficult, especially since the gas control system requires a ventilated housing.

What is however regarded as unacceptable in the prior art gas control systems is that they have in addition to the spatial difficulties in their positioning also control engineering difficulties since the inertia of the system increases with increasing distance from the combustion chamber. Furthermore, there are a large collection of components that must be controlled partly by the engine control. Accordingly, the gas pressure control systems known in the art are expensive and maintenance-intensive, wherein also the reliability of the gas engine or dual-fluid engine depends thereupon. Overall, it must be concluded that the gas metering, which takes place via the gas control by means of controlled differential pressure, leads to inaccuracies and thus not to optimal supply of the internal combustion engine.

The object of the invention is therefore to simplify and improve the gas metering of an internal combustion engine.

BRIEF SUMMARY OF THE INVENTION

This object is achieved with a gas feed method for a gas engine or dual-fuel engine according to claim 1. In addition, the task is solved with a gas feed apparatus for this gas engine or dual-fuel engine according to the independent apparatus claim.

Thereby, that the combustion gas is supplied to the gas valve unregulated without regard for the operating condition of the gas engine or dual-fuel engine, a predetermined mass of the combustion gas is supplied for the cylinder of the gas engine or dual-fuel engine, without requiring a gas control system in the gas feed. The gas metering takes place solely by the precise control of the gas valve, which is located immediately in front of the inlet region of the gas engine or dual-fuel engine, so that no inertia effects can occur and the engine is always supplied with the exact right amount of gas. With regard to the apparatus, this is achieved in that there is an omission of a regulation of the gas pressure upstream of the gas valve in dependence on the operating state of the gas engine or dual-fuel engine.

When the pressure of the combustion gas supplied to the gas valve is reduced or limited, an excessively high supply pressure from the gas source is reduced to a constant value or linearly to a lower value. This facilitates the operation of the gas valve to allow, despite varying gas pressure differences acting on the gas valve, nevertheless a fast opening and closing of the gas valve.

If, during operation of the gas engine or dual-fuel engine, the pressure before and after the gas valve and the temperature of the supplied combustion gas are measured, the engine operating point is detected, and from these the opening duration and/or the unblocked opening cross-sectional area of the gas valve are controlled, a mass of the combustion gas is supplied to the respective cylinder of the gas engine or dual-fuel engine based on the measured values and the determined engine operating point. On the basis of the measurement results, the control of the opening period and/or the unblocked opening cross-sectional area of the gas valve can be readjusted so that the supplied combustion gas mass can be maintained more precisely.

In a further, preferred embodiment, it is provided that a previously detected flow performance map of the gas valve is stored and the opening duration and/or the unblocked opening cross-sectional area of the gas valve are controlled according to the current measured values, the current engine operating point and the flow performance map. The flow performance map of the valve is here preferably determined in advance using a test stand.

When the gas valve is operated pressure-balanced, the required gas valve throw forces are reduced, further increasing reliability and metering accuracy.

Thus, using the established flow performance map, taking into account the measured pressure and the measured temperature, the actually supplied combustion gas can be determined very precisely. Thus advantageously, control of gas pressure dependent on the currently retrieved performance of the gas engine or dual-fuel engine is not performed upstream ahead of the gas valve, whereby a significantly more accurate gas metering for the internal combustion engine is achieved relative to the prior art. In order to achieve fast and predictable travel of the gas valve independent of the respective pressurizing pressure, the gas valve is operated pressure-balanced.

If a pressure limiter or a pressure reducer is provided upstream of the gas valve in the gas feed, an excessively high gas pressure on the gas feed side of the gas valve can be avoided.

It is preferred that the gas valve is designed to be actuated independent of the pressure difference applied there.

Due to the fact that the gas valve is designed as a pressure-balanced valve, the gas valve can be operated with substantially constant driving force independent of the pressure differences acting on the gas valve. Here, "pressure-balanced valve" means a valve with pressurized surfaces, in which the effective cross sections (surfaces) of the valve are formed in such a manner, that the pressurizing regime acting on both sides of the valve to be operated are approximately balanced with respect to the force acting on the shaft of the valve. In this case, "approximately" or "nearly" means that the effective cross-sections have a maximum deviation of 10%, preferably less than 5%, so that the required actuating forces, relative to a non-pressure-balanced valve, are reduced to at least $\frac{1}{10}$ and more preferably $\frac{1}{20}$ or even reduced to 0.

The regulation of the pressure of the supplied combustion gas, which has hitherto been carried out in a gas pressure control system as a function of the required charge pressure, is therefore superfluous. Previously, the pressure was measured downstream of the gas valve (boost pressure) and the pressure regulator in the gas pressure control system was regulated in response to this measured pressure and the engine operating condition. This prevented that too great a differential pressure existed between the combustion gas to be supplied and the required boost pressure at the gas valve, so that in certain cases an opening of the gas valve may no longer be possible or lead to significant inaccuracies in the gas metering.

It should be noted that the boost pressure changes depending on the load situation on the gas engine or dual fuel engine and thus short term intense pressure changes arise, and therewith changes in the pressure differential. Due to the design of the gas valve as a pressure-balanced valve, the pressure difference between the gas to be supplied $p_1$ and the boost pressure $p_2$ plays virtually no role any longer, since, by the pressure compensation on the valve, in any pressure differential situation an opening the valve with approximately the same force is possible.

Therefore, especially when using a pressure-balanced valve for a gas engine or dual fuel engine with a gas feed and at least one cylinder, wherein the gas valve is arranged in the gas feed system, it is possible to dispense with the gas pressure control upstream of the gas valve dependent on the instantaneously accessed performance of the gas engine or dual-fuel engine.

Thereby, that the gas valve has a poppet valve and an opposing piston, wherein the opposing piston has approximately the same effective cross-section as the poppet valve, the construction of the pressure compensation through the correspondingly designed opposing piston is easily achieved.

"Approximately" means that the effective cross-section of the opposing piston deviates at most 10%, preferably less than 5% from the effective cross section of the valve. In addition to a poppet valve, also concentric valves or basically valves with pressure acted-upon surfaces are conceivable, so that the term "poppet valve" used here is intended to include these variations.

When the poppet valve and the opposing piston are provided on a shaft, wherein the poppet valve and the opposing piston of the gas valve are guided with the shaft in a housing, the pressure equalization forces are passed directly through the shaft from the poppet valve to the opposing piston or vice versa.

Alternatively to the configuration with an opposing piston, it is also possible that the gas valve is a poppet valve and a pressure diaphragm, said pressure diaphragm having approximately the same effective cross-section as the poppet valve. The back pressure on the pressure diaphragm corresponds to the poppet valve, so that pressure compensation is ensured. Again, "about" means a maximum deviation of 10%, preferably less than 5%.

Since the poppet valve and the pressure diaphragm are seated on a shaft, wherein the poppet valve along with the shaft are guided in a housing and the pressure diaphragm is secured in the housing, this pressure is directed from the pressure diaphragm directly via the shaft onto the poppet valve.

If an auxiliary valve with auxiliary valve actuator is provided for the gas valve, for example in the shape of a valve block, which in the initial position forms a fluid connection to a side of the opposing piston and in the activated position provides a connection to a lower pressure, the pressure-balanced valve is switched indirectly via the auxiliary valve actuator and the therewith associated auxiliary valve. In this case, the auxiliary valve connects in its initial position the mixing chamber in which the combustion air, consisting of gas and ambient air, is prepared for intake in the gas engine or dual-fuel engine, with the outer side of the opposing piston, so that only a small force acts on shaft of the gas valve in the direction of the closed position of the gas valve. Upon actuation of the auxiliary valve actuator the auxiliary valve is moved to an activated position, so that via the valve block a connection of the space above the opposing piston with a reduced pressure, such as ambient air, occurs. Therewith the gas valve is released from the slight excess of force of the pressure-balanced valve towards its closed position defined closed position, thus the gas valve opens, because the corresponding counter-force on the outside of the opposing piston is missing.

In an alternative embodiment, for opening and closing, an actuator acting on the shaft is provided for positioning the gas valve. The actuator is, for example, an electromotor drive, electromagnetic, pneumatic or hydraulic drive, which upon actuation of the actuator adjusts the shaft and thus the gas valve from its closed position into its open position.

To mechanically preset the closed position as the rest position, a spring is arranged at the gas valve, which preloads the valve in the closing direction. In this case, the spring may be a compression, tension or torsion spring.

BRIEF DESCRIPTION OF THE SEVERAL VIEWS OF THE DRAWINGS

Hereinafter, various embodiments of the invention will be described with reference to the accompanying drawings.

Therein there is shown in.

DETAILED DESCRIPTION OF THE INVENTION

Figure 1:
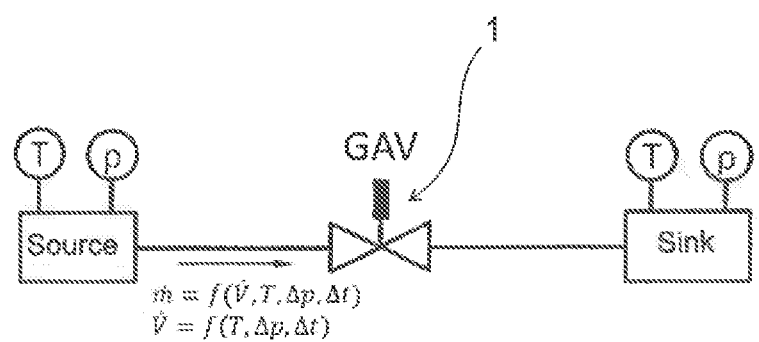
FIG. 1 a test rig construction for determining the flow behavior of the gas valve, FIG. 2 a determined flow performance map, FIG. 3 a first embodiment of a gas valve in a sectional, schematic side view, FIG. 4 a second embodiment of a gas valve, FIG. 5 a third embodiment of a gas valve, FIG. 6 a fourth embodiment of a gas valve and FIG. 7 a fifth embodiment of a gas valve.

In FIG. 1, a test stand is shown with which the flow behavior of the gas valve 1 to be used can be determined. The test bench consists of a measuring section into which the gas valve 1 is initially mounted in the closed state and then subjected to a defined source and reduced pressure. Care must be taken to ensure that the source and reduced pressure (i.e., the pressure ratio across the valve) always correspond to values that can also occur in real engine operation. The reduced pressure, which corresponds to the charge air pressure, is in this case generally in a range between 1 $bar_{abs}$ and 6 $bar_{abs}$, while the source pressure corresponds to the (reduced) tank pressure of the gas tank, minus the system pressure losses. As a rule, the tank pressure is max. 10 $bar_{abs}$, but this can vary. The valve is now opened for different pressure conditions, gas temperatures and opening times, and the through-flow is determined by measurement. The variation of the opening intervals of the valve is important, especially since with short opening times (e.g., in part-load operation) the proportion of closing and opening operation within the total flow time is significantly greater than at large opening times, which are characterized in that the valve is completely open over a relatively long period of time and the through-flow behavior consequently does not change for a corresponding length of time. Accordingly, the volume through-flow in these (part-load) operating points is very dynamic and thus also valve-specific, which makes calculation significantly more difficult. Furthermore, it is theoretically possible, depending on the valve design and pressure ratio, that in the narrowest cross section the flowing medium reaches the velocity of sound, and thus a limit value for the volumetric flow through of the valve to be reached. This phenomenon can influence the structure of the map.

Figure 2:
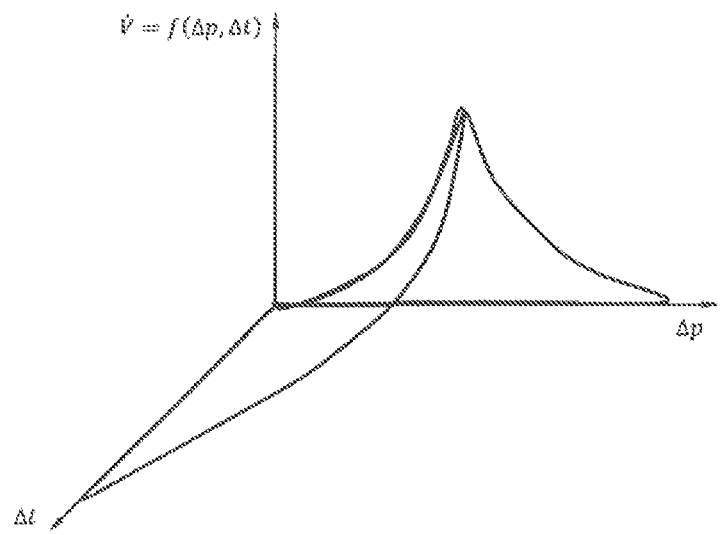

After determining a sufficient number of sampling points, the valve flow characteristic map can be produced (FIG. 2). Now the gas volume that passes through the valve is known as a function of the opening duration and the pressure ratio in each theoretically possible operating point of the machine. Taking into account the temperature and density and calorific value of the fuel gas, the supplied energy flow or the amount of energy supplied per cycle can now be determined. By storing said map in the engine control, a control strategy is conceivable, as has long been used in diesel engines (Note: Here, the amount of energy supplied is known, since it is proportional to the volume of fuel which is in the liquid state in the equipment).

The inventive method makes it possible to replace the pressure regulator from the original configuration with a simple pressure reducer or to completely dispense with this component. By eliminating the control tasks, there is no need to incorporate an additional component in the engine control. Furthermore, there is no longer any need to position the remaining gas fittings in the immediate vicinity of the engine.

In the implementation of the method according to the invention, the flow performance map is to be stored in the controller, so that the gas mass for each injection process and thus the amount of energy supplied can be measured either in good approximation or even exactly (if the gas composition and thus the calorific value are known). The method assumes that the volume flow through the valve is known at any time in dependence on the pressure difference across the valve. By means of a temperature and pressure measurement, the density of the gas can be determined. The product of density and volume flow provides the gas mass flow, which, multiplied by the calorific value, gives the energy flow supplied to the engine.

Figure 3:
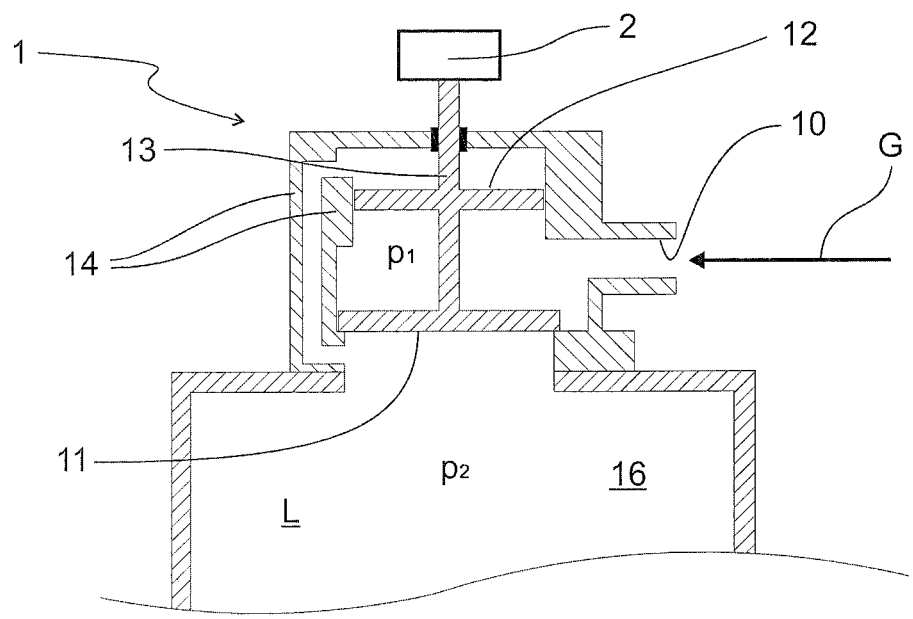

In FIG. 3 is shown in a schematic cross section of a gas valve 1 with a gas feed 10 for combustion gas as well as a mixing chamber 16, which is set immediately upstream of a cylinder, not shown in detail, of a gas engine or dual-fuel engine. In the gas feed 10, the combustion gas G is at a gas pressure $p_1$. In the mixing chamber 16 there is a boost pressure $p_2$, which depends on the respective currently requested operating point of the gas engine or dual-fuel engine. In the mixing chamber 16 is combustion air L, which is sucked, via the engine intake valves (not shown), into the combustion chamber of the cylinder or the engine together with the combustion gas G, as required, supplied via the gas valve 1 during operation of the gas engine or dual-fuel engine.

The gas valve 1 has a substantially cylindrical housing 14, in which a poppet valve 11 is displaceable along the cylinder axis via an actuator 2 and can be adjusted from a closed position, as shown in FIG. 3, into an open position (in FIG. 3 shifted upward). Here the poppet valve 11 is connected with the actuator 2 via a shaft 13 located in the cylinder axis. Further, on the shaft 13 an opposing piston 12 is arranged, which is mounted also sealingly in the housing 14 and in its displacement from the closed position to the open position in the housing 14 is guided sealingly. The housing 14 of the gas valve 1 is however designed so that the gas pressure $p_1$ pressing on the poppet valve 11 from above also presses on the opposite piston 12 from the bottom. Because the opposing piston 12 in the embodiment of FIG. 3 is only slightly smaller than the poppet valve 11, the pressure forces caused by the gas pressure $p_1$ on the gas valve 1 are essentially balanced. On the opposite sides of the poppet valve 11 and the opposing piston 12 there act opposing pressure forces of the boost pressure $p_2$, so that these also substantially balance. This constitutes a pressure-balanced valve 1.

To open the valve, the actuator 2 thus requires only a relatively small force on the shaft 13 acting upwards in drawing plane according to FIG. 3. Due to the slightly smaller opposing piston 12 in contrast to the poppet valve 11, however, when opening the valve 1 a force in the direction of the closed position is always to be overcome, since the gas pressure $p_1$ is always greater than the boost pressure $p_2$. In so far, the pressure-balanced valve 1 is slightly loaded in its closed position by $p_1 > p_2$.

Figure 4:
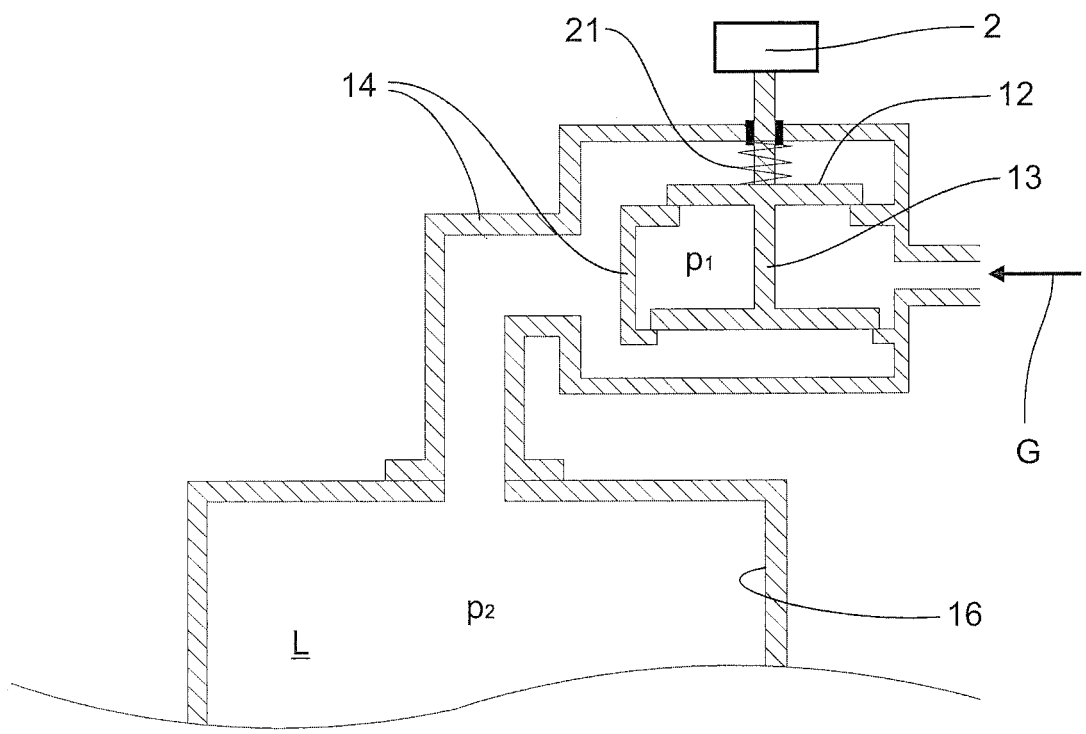

In the second exemplary embodiment according to FIG. 4, in which the same effective components are referred to with the same reference numerals, the gas valve 1 is also designed as a poppet valve 11 with opposing piston 12, guided in a housing 14. In this embodiment, although the diameter of the poppet valve 11 is again slightly larger than the opposing piston 12, however this valve 1 has next to the actuator 2 a spring 21 seated on the shaft 13, which as a pre-loaded pressure spring urges the shaft 13 with opposing piston 12 and poppet valve 11 downwards in the plane of drawing in FIG. 4. This design ensures that even at approximately the same gas pressure $p_1$=boost pressure $p_2$ the gas valve 1 remains in its closed position. When the valve is actuated via actuator 2 this causes the actuator to open the gas valve 1 by lifting the shaft 13 against the pressing forces acting on poppet valve 11 and opposing piston 12 (approximately balanced pressure relief) and the force of the spring 21.

Figure 5:
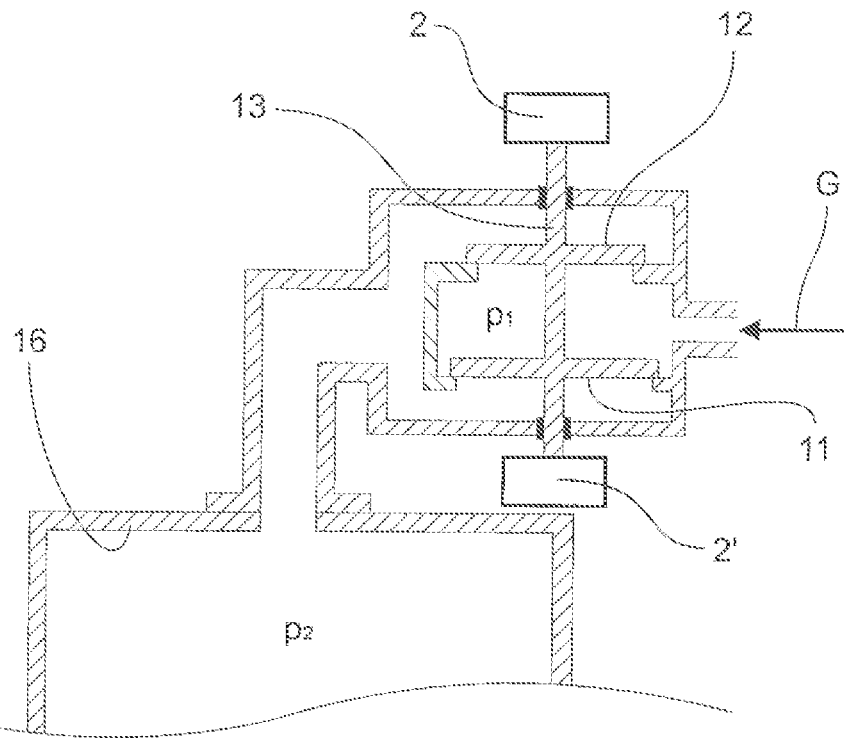

In FIG. 5 there is shown a third embodiment of the invention with a gas valve 1, which has shaft 13 extending through both sides by the housing 14 of the gas valve 1. Here on both sides of the housing 14, on the outwardly protruding ends of the shaft 13, respectively, an actuator 2, 2' is provided, which together can switch the shaft 13 from the closed position into the open position and back again. Otherwise, the gas valve 1 is equipped, as in the embodiments 1 and 2 as shown in FIGS. 3 and 4, with a poppet valve 11 and the opposing piston 12.

Figure 6:
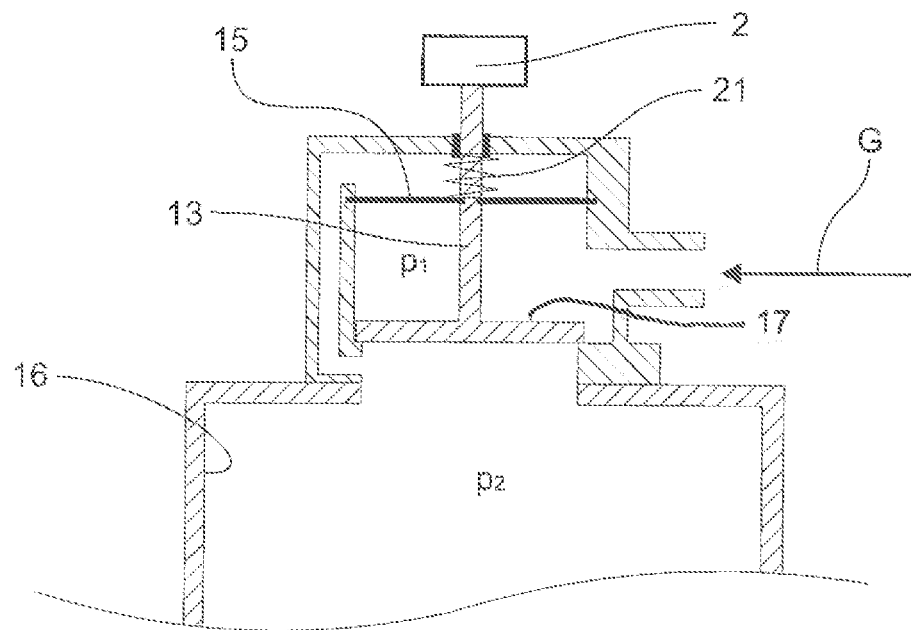

In FIG. 6 a fourth embodiment of a gas valve 1 is shown on a gas engine or dual-fuel engine, in which in the housing 14 of the gas valve 1 is a pressure diaphragm 15 is arranged so that the pressure diaphragm 15 faces the poppet valve 11 and is anchored at its outer circumferential edge in the housing 14, whereas the pressure diaphragm 15 communicates in the center with the shaft 13. With appropriate pressure difference between $p_1$ and $p_2$ with $p_1 > p_2$ thus on the one hand forces act on the poppet valve 11 from top to bottom and via the pressure diaphragm 15 from the bottom to the top in drawing plane of FIG. 4, which compensate each other exactly due to the matching areas. Analogously, on the opposite sides of the pressure diaphragm 15 or the poppet valve 11 the boost pressure $p_2$ acting in opposite directions is likewise effective to also balance. Thus, there is a pressure-balanced valve 1, which can be positioned in the open position or the closed position via the actuator 2 with relatively small actuating forces. In order to achieve a preload in the direction of the closed position there is also arranged a compression spring 21 on the shaft 13 between the housing and the pressure diaphragm 15. The overall force acting on the valve seat 17 via the shaft 13 and poppet valve 11 is thus essentially caused by the compression spring 21. Accordingly, the actuating force of the actuator 2 can be coordinated with the counterforce of the compression spring 21.

Figure 7:
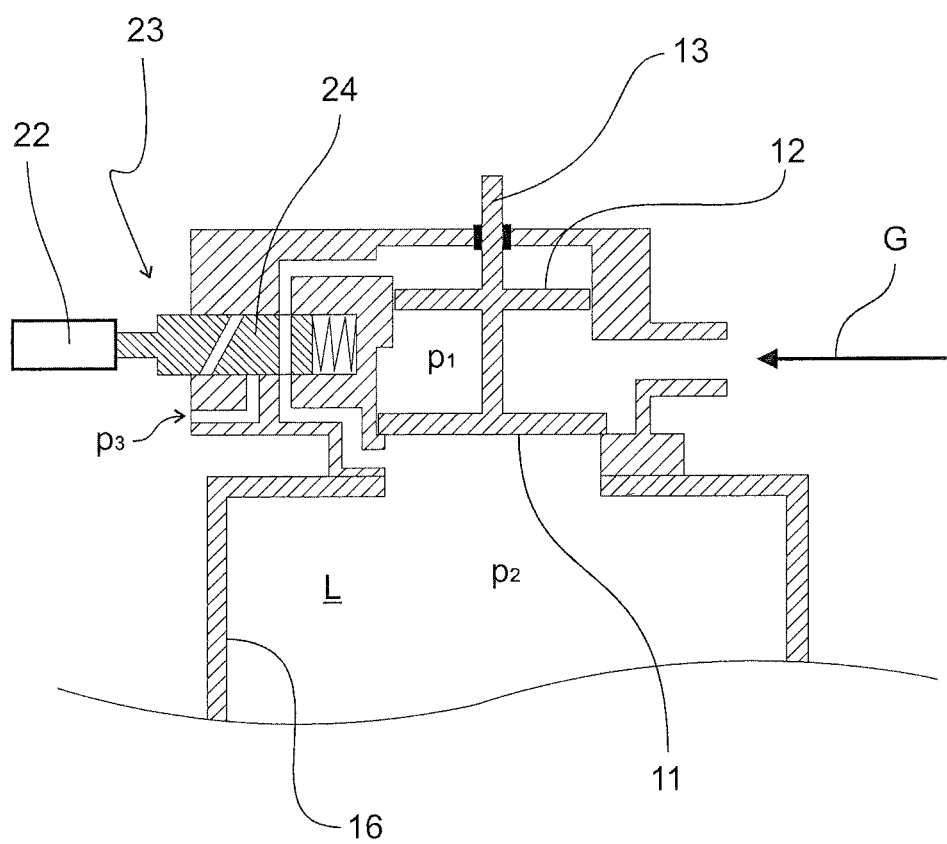

In FIG. 7 a fifth embodiment of a gas valve 1 on a gas engine or dual-fuel engine is shown, in which within the housing 14 of the gas valve 1 again a poppet valve 11 and an opposing piston 12 are arranged on a common shaft 13, which provides a pressure relief on the valve 1 between the combustion gas G which is under a pressure $p_1$ and the combustion air L under the lower pressure $p_2$. In contrast to the embodiments one, two and three, however, the shaft 13 of the gas valve 1 is not actuated directly by an actuator. Rather, in the fifth embodiment an auxiliary actuator 22 is provided, which actuates an auxiliary valve 23. The auxiliary valve 23 has a valve block 24, which in its resting position, as shown in FIG. 7, allows a fluid connection from the mixing chamber 16 with the combustion air L located there to the top of the opposing piston 12 and thus creates a pressure compensation at the gas valve 1. Due to the slightly larger area of the poppet valve compared to the opposing piston, the gas valve 1 lies with a small force against the seat in its closed position.

If then the auxiliary actuator 22 is energized and the auxiliary valve 23 with its valve block 24 shifted to the right (in the drawing plane of FIG. 7), the space above the opposing piston 12 is pressure relieved via the then newly created fluid connection to a reduced pressure $p_3$, for example, the ambient pressure. This eliminates the approximate pressure balancing at the gas valve 1, so that the gas valve 1 opens out of the closed position.

Next the auxiliary valve 23 is again adjusted to its resting position via auxiliary actuator 22, pressure ($p_2$) acting at the moment in the mixing chamber 16 builds again on the top of the opposing piston 12, so that due to the slightly larger effective area of the poppet valve 11 compared to the opposite piston 12 the valve 1 closes again. Optionally, the closing of the gas valve 1 is supported by a pressure-tension spring or torsion spring in the direction of the closed position, which is however not explicitly shown in FIG. 7.

In all five embodiments no gas control system is provided in the gas feed 10 upstream in the figures. The gas pressure $p_1$ of the combustion gas G does not need to be adjusted against the ever-changing boost pressure $p_2$ due to the effective pressure relief of the gas valve 1. In that regard, a gas pressure control for supplying gas engines or dual-fuel engines, as has been done so far, is not required especially with the pressure-balanced gas valve (1). In the gas feed, of course a gas filtration and optionally a safety shutoff may be provided. In that regard—according to the mandated safety regulations and the quality of gas being processed—although a pretreatment of the gas and a possible safety shutoff may be provided, however, a gas pressure control in dependence on in the gas engine or dual-fuel engine existing boost pressure and operating condition is not required. This considerably simplifies the operation of the gas engine or dual-fuel engine, reduces the maintenance time and effort and improves the reliability of the gas engine or dual-fuel engine during gas operation, so that any redundancies prescribed in the case of, for example, marine drives for safety reasons may no longer be necessary.

LIST OF REFERENCE NUMBERS 1 gas valve, pressure-balanced valve
10 gas feed
11 poppet valve
12 opposing piston
13 shaft
14 housing
15 pressure diaphragm
16 mixing chamber
17 valve seat
2, 2' actuator
21 spring
22 auxiliary actuator
23 auxiliary valve
24 manifold
G combustion gas
L combustion air
$p_1$ gas pressure
$p_2$ air boost pressure
$p_3$ reduced pressure, ambient pressure

The invention claimed is:

1. A gas pressure control system free gas feed method for a gas engine or dual-fuel engine in which combustion gas (G) is combusted with combustion air (L), comprising
arranging a gas valve (1) for supplying combustion gas (G) in the combustion air (L) upstream of the gas engine or dual-fuel engine, and
supplying the combustion gas (G) to the gas valve (1) without a gas pressure control system regulated by the load situation and charge air pressure of the gas engine or dual-fuel engine,
wherein the gas metering occurs solely via the precise control of the gas valve, wherein during operation of the gas engine or dual-fuel engine, the pressure before and after the gas valve (1) as well as the temperature of the supplied combustion gas are measured, the engine operating point is detected and from this at least one of an opening duration and an unblocked opening cross-sectional area of the gas valve (1) are controlled, and
wherein the gas valve (1) is provided immediately upstream of the inlet area of the gas engine or dual-fuel engine.

2. The method according to claim 1, wherein a previously detected flow performance map of the gas valve (1) is stored and at least one of the opening duration and the unblocked opening cross-sectional area of the gas valve (1) is controlled according to instantaneous measured values, the current engine operating point and the flow performance map.

3. The method according to claim 1, wherein the gas valve (1) is a pressure-balanced valve.

4. A gas engine or dual-fuel engine of the type having no gas pressure control system in the gas feed, in which combustion gas (G) is burned with combustion air (L), with
a source of pressurized combustion gas,
a source of combustion air (L),
a gas engine or dual-fuel engine having an inlet area,
a pressure-balanced gas valve (1) provided immediately upstream of the inlet area of the gas engine or dual-fuel engine, the gas valve (1) supplying combustion gas (G) in the combustion air (L) upstream of the gas engine or dual-fuel engine,
a gas feed (10) connecting the source of pressurized combustion gas to the gas valve (1), the gas feed (10) having no gas pressure control system for control of the gas pressure upstream of the gas valve (1) in dependence on the operating state of the gas engine or dual-fuel engine, and
a gas pressure control system comprising control logic wherein a previously detected flow performance map of the gas valve (1) is stored, the control logic programmed to receive measurements during operation of the gas engine or dual-fuel engine including the pressure before and after the gas valve (1) as well as the temperature of the supplied combustion gas are measured, wherein at least one of the opening duration and the unblocked opening cross-sectional area of the gas valve (1) is controlled according to instantaneous measured values, the current engine operating point and the flow performance map independent of the actual pressure differential, wherein gas metering in the gas pressure control system occurs solely via precise control of the gas valve (1).

5. The gas feed apparatus according to claim 4, wherein in the gas feed (10), a pressure limiter or a pressure reducer independent of the operating state of the gas engine or dual-fuel engine is provided upstream of the gas valve (1).

6. The gas feed apparatus according to claim 4, wherein the gas valve (1) is designed to be actuated independently of the there impinging pressure difference.

7. The gas feed apparatus according to claim 6, wherein the gas valve (1) is a pressure-balanced valve.

8. The gas feed apparatus according to claim 6, wherein the gas valve (1) is a poppet valve (11) and has an opposing piston (12), wherein the opposing piston (12) has approximately the same effective cross-sectional area as the poppet valve (11).

9. The gas feed apparatus according to claim 7, wherein the poppet valve (11) and the opposing piston (12) are provided on a shaft (13), wherein the poppet valve (11) and the opposing piston (12) of the gas valve (1) are guided with the shaft (13) in a housing (14).

10. The gas feed apparatus according to claim 7, wherein the gas valve (1) has a poppet valve (11) and a pressure diaphragm (15), wherein the pressure diaphragm (15) has approximately the same effective cross-sectional area as the poppet valve (11).

11. The gas feed apparatus according to claim 10, wherein the poppet valve (11) and the pressure diaphragm (15) are arranged on a shaft (13), wherein the poppet valve (11) with the shaft (13) are guided in a housing (14) and the pressure diaphragm (15) is secured in the housing (14).

12. The gas feed apparatus according to claim 7, wherein for the gas valve (1) an auxiliary valve (23) with auxiliary actuator (22) is provided, which in a rest position forms a fluid connection to one side of the opposing piston (12) or pressure diaphragm (15) and in a activated position provides a fluid connection to a reduced pressure ($p_3$).

13. The gas feed apparatus according to claim 9, wherein an actuator (2) acting on the shaft (13) is provided for positioning the gas valve (1).

\* \* \* \* \*